United States Patent [19]

Kelm

[11] Patent Number: 4,729,702

[45] Date of Patent: Mar. 8, 1988

[54] CLAMPING MEANS FOR TAPER TOOL SHANKS

[75] Inventor: Walter Kelm, Mt. Clemens, Mich.

[73] Assignee: Carboloy Inc., Warren, Mich.

[21] Appl. No.: 917,907

[22] Filed: Oct. 10, 1986

[51] Int. Cl.[4] .................... B23B 31/10; B23Q 3/12
[52] U.S. Cl. ........................... 409/234; 409/232; 279/67; 279/114
[58] Field of Search ............... 409/234, 232; 279/1 T, 279/16, 17, 66, 67, 69, 70, 112, 113, 114, 121

[56] References Cited

U.S. PATENT DOCUMENTS

| | | | |
|---|---|---|---|
| 2,485,799 | 10/1949 | Moytych | 279/67 |
| 3,758,125 | 9/1973 | Cornelia | 279/103 |
| 3,762,271 | 10/1973 | Poincenot | 408/239 A |
| 3,851,562 | 12/1974 | Tomita et al. | 29/568 |
| 4,352,612 | 10/1982 | Benatti | 409/233 |
| 4,499,800 | 2/1985 | Stahl | 82/36 |
| 4,575,293 | 3/1986 | Berti | 409/234 |
| 4,604,009 | 8/1986 | Tennerstedt | 409/233 |
| 4,611,960 | 9/1986 | Quenneville et al. | 409/234 |

FOREIGN PATENT DOCUMENTS

| | | | |
|---|---|---|---|
| 731859 | 4/1966 | Canada | 409/234 |
| 73750 | 2/1952 | Denmark | 279/67 |
| 1214959 | 12/1970 | United Kingdom | 279/67 |

Primary Examiner—Gil Weidenfeld
Assistant Examiner—Daniel W. Howell
Attorney, Agent, or Firm—Hedman, Gibson, Costigan & Hoare

[57] ABSTRACT

A tool clamping device is provided for quickly and securely clamping rotary tooling adaptors to tool clamp blocks. The device is adaptable to semi-automatic or robotic tool switching operations and minimizes machine downtime.

13 Claims, 4 Drawing Figures

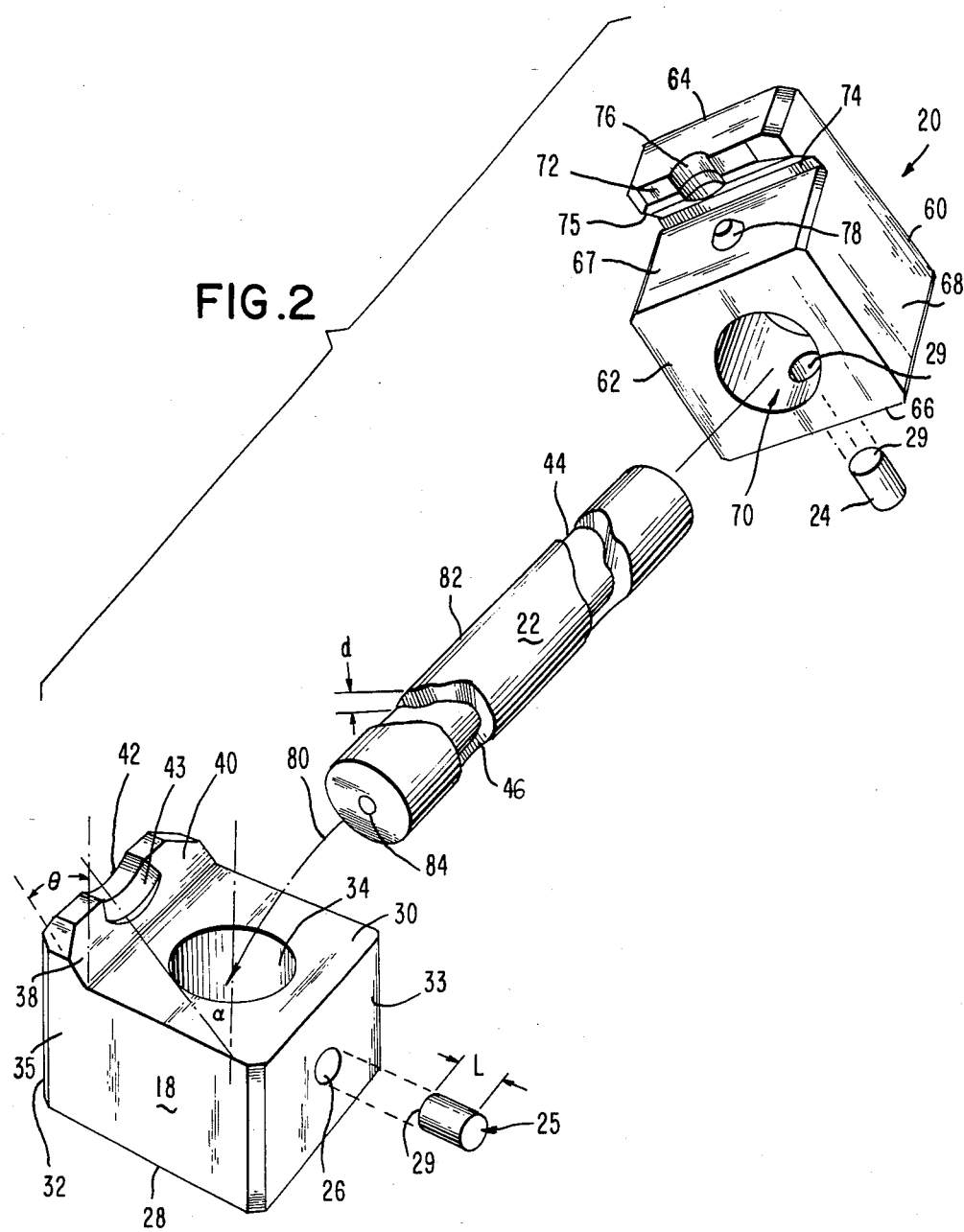

CLAMPING MEANS FOR TAPER TOOL SHANKS

BACKGROUND OF THE INVENTION

The present invention relates generally to tool clamping devices and more particularly to an improved device for quickly and securely clamping rotary tooling adaptors to tool clamp blocks.

In the machine tool industry, and particularly in automated systems, it is necessary to use a variety of machine tools to perform specific machining operations on a single work piece. Repeated changing of work tools results in considerable amount of downtime in the operation of the machine and consequently a loss of production time.

The replacement of a tool holder in a tool clamp block or spindle is ordinarily a manual operation, time consuming, laborious, and somewhat imprecise thereby requiring certain adjustments after replacement. If the replacement operation is automatic or semi-automatic, the mechanical strength requirements of the tool holding mechanism leads to the need for complex and powerful changing mechanisms usually based on hydraulic principles, especially to unclamp the tool holder.

In the prior art there have been developed numerous types of tool clamping devices intended to secure tooling adaptors to clamp blocks. However, such devices are not effective in significantly reducing the amount of downtime on a machine caused by a tool changeover, and are further complicated in structure and expensive to manufacture.

It is desirable, therefore, to have a quick release mechanism which is not dependant on complex equipment and lends itself to manual control as well as sophisticated automated tooling systems.

SUMMARY OF THE INVENTION

It is an object of the present invention to provide a new and improved clamping means for taper tool shanks which provides direct axial pull on the tool shank and which is easy to handle, has simple construction and is relatively inexpensive.

It is another object of the invention to provide a simplified clamping mechanism capable of operating with minimum force and with a minimum locking and unlocking motion of the mechanism.

To this end, there is provided a clamping mechanism positioned within a cavity of a conventional tool clamp block adapted for receiving a rotary tooling adaptor therein. The clamping mechanism includes an upper shoe, a lower shoe, a cam shaft rotatably engaged to said shoes and a pair of drive pins positioned in each of said shoes in further communication with said cam shaft so as to provide a means for slidably advancing said shoes along the cam shaft. The upper and lower shoes are further adapted for receiving and clamping a retention knob mounted at one end of the tooling adaptor for securing the tooling adaptor within the tool clamp block.

In accordance with the present invention, the cam shaft is rotatably and slidably mounted within a cylindrical bore in said upper shoe and within a cylindrical bore in said lower shoe. The cam shaft is provided with a pair of screw-like grooves for engaging the drive pins radially positioned within said shoes. The cam shaft is further provided with a turning means at one end of said shaft for imparting a rotational force to said cam shaft. When it becomes necessary to replace a cutting tool adaptor within the tool clamp block the cam shaft is rotated to effect an axial movement of the upper and lower shoes in opposing directions within the cavity of the clamp block whereby the shoes disengage the retention knob of the rotary tooling adaptor while freeing the adaptor for removal. The tooling adaptor is then removed from the clamp block, either manually or automatically, and a replacement adaptor is inserted into the tool clamp block. The cam shaft is then rotated in the opposite direction whereby the upper and lower shoes move axially toward the center of the cam shaft to engage and secure the retention knob of the rotary tooling adaptor within the tool clamp block.

BRIEF DESCRIPTION OF THE DRAWINGS AND DETAILED DESCRIPTION OF THE INVENTION

The following is a detailed description together with the accompanying figures of an illustrative embodiment of the invention. It is to be understood that the invention is capable of modification and variation apparent to those skilled in the art within the spirit and scope of the invention.

Figure 1:
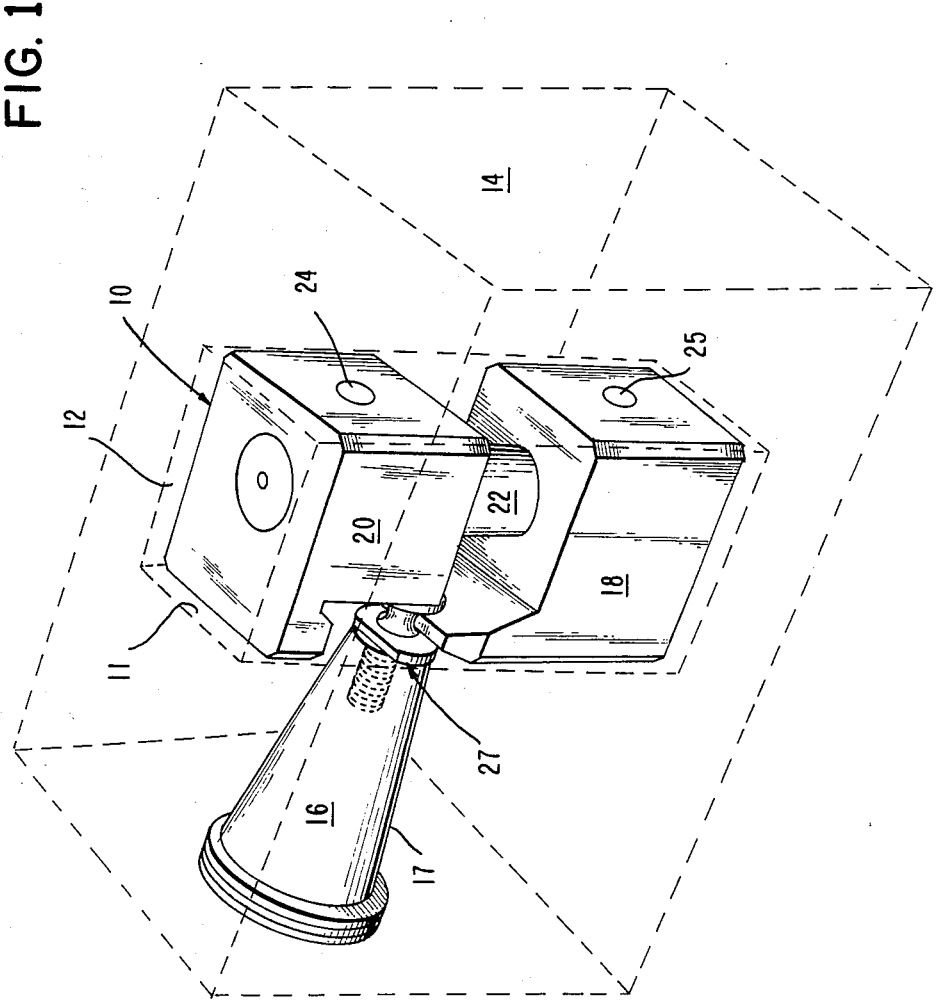
FIG. 1 is a perspective view employing a preferred embodiment of a clamping mechanism incorporated in a conventional tool clamp block adapted for receiving a rotary tooling adaptor.

Referring to the drawings and first to FIG. 1, there is shown a preferred embodiment of a completely assembled clamping mechanism 10 positioned within a cavity 12 of a tool clamp block 14 which is adapted for receiving a rotary tooling adaptor 16.

As shown in FIG. 1 the clamping mechanism 10 comprises a lower shoe 18, an upper shoe 20 and a cam shaft 22 disposed between said shoes. The upper and lower shoes include drive pins 24 and 25, respectively, slidably mounted in said shoes for engaging said cam shaft 22. A retention knob 27 threaded into one end of the tooling adaptor 16 provides the means by which the shoes 18 and 20 axially pull and clamp the tooling adaptor 16 in the tool clamp block 14. Operationally, the cam shaft 22 is rotated to impart axial movement of the shoes 18 and 20 toward or away from said retention knob 27. As the upper and lower shoes are drawn toward each other, they wedgingly engage the retention knob 27 causing an axially pull and locking of the rotary tool adaptor 16 in the tool clamp block 14.

Sufficient clearance is provided between the clamping mechanism 10 and the inside walls of the cavity 12 so as to allow the mechanism 10 to float, i.e., to move freely within the cavity 12 during the locking and unlocking operations. As a result of this floating feature, the clamping mechanism 10 is self-centering with respect to the retention knob 27. For example, if during the locking operation, either one of shoes 18 and 20 should contact the retention knob 27 before the other, it will remain in contact until the other shoe is also drawn in contact with knob 27 at which point both upper and lower shoes 20 and 18 will be drawn together to wedgingly engage the retention knob within the clamp block 14.

Figure 2:
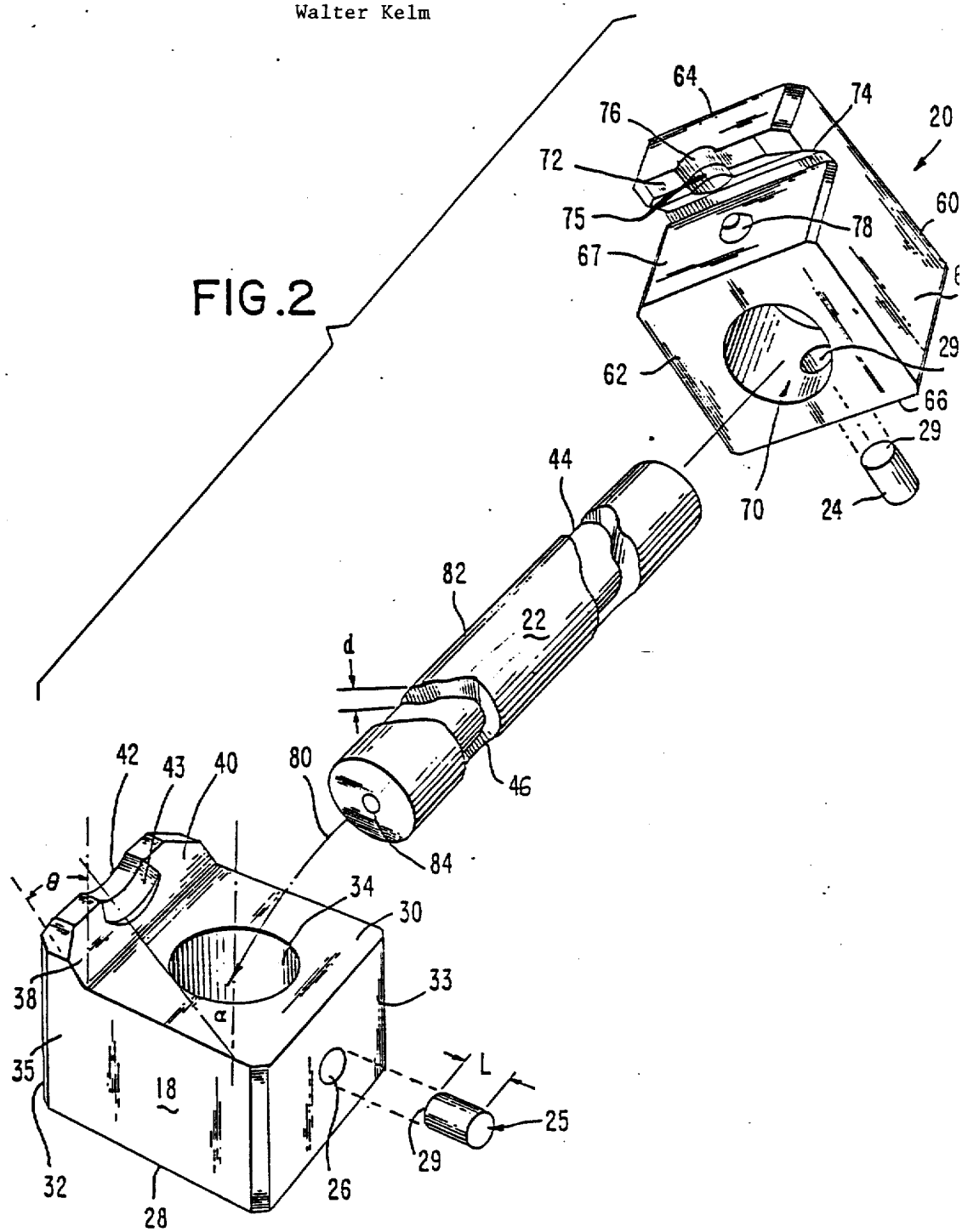
FIG. 2 is an exploded perspective view of the clamping mechanism of FIG. 1 according to the present invention.

Details of the clamping mechanism 10 are more particularly illustrated in the exploded view of FIG. 2. As shown, the lower shoe 18 is generally rectangular in structure and is adapted to wedgingly engage the retention knob of the tooling adaptor 16. The lower shoe 18 includes a base 28, a top 30, a front end wall 32, a rear end wall 33 and parallel sides 35. Extending vertically through the lower shoe 18 from the top 30 to the base 28 is a cylindrical bore 34 for receiving the cam shaft 22. The lower shoe 18 includes a horizontal bore 26 extending from the rear end wall 33 and terminating in the cylindrical bore 34. The drive pin 25 is slidably mounted in said horizontal bore 26 for engaging the cam shaft 22.

The front end wall 32 of the lower shoe 18 is extended upwardly along the width of the shoe 18 to a level above the top 30 of the shoe 18 thereby forming a shoulder 38. An inner wall 40 tapers downwardly and inwardly from the shoulder 38 to the top 30 of the shoe 18 at an angle $\theta$ to the axis of the cylindrical bore 34. A concave recess 42 is included in the shoulder 38 to provide clearance for the retention knob 27. A cavity 43 is provided in the inner wall 40 at an angle $\alpha$ to the axis of the bore 34 for engaging and mating a conical surface 56 of the retention knob 27. The angle $\alpha$ of the cavity 43 is generally greater than or equal to the angle $\theta$ of the inner wall 40.

The retention knob 27 is conventional and includes a threaded end 50 for threading into one end of the tooling adaptor 16. The retention knob 27 also includes a shoulder 52, a neck 54, a conical gripping surface 56 and a tip 58. The conical gripping surface 56 tapers downwardly and outwardly from the neck 54 to the tip 58 at an angle $\alpha$ corresponding to the angle $\alpha$ of the cavity 43 of inner wall 40 of the lower shoe 18. The angle $\alpha$ may be in the range of 10° up to about 90° and preferably from about 10° to 45°. The angular mating of the conical surface 56 to the cavity 43 of inner wall 40 of the lower shoe 18 provides area contact between the clamping mechanism and the tooling adaptor as opposed to line contact typical of conventional locking systems.

Details of the upper shoe 20 are also illustrated in the exploded view of FIG. 2. As shown, the upper shoe 20 is similar to the lower shoe 18 in that it is generally rectangular in structure and is adapted to wedgingly engage the retention knob 27 of the tooling adaptor 16.

The upper shoe 20 includes a base 60, a top 62, a front end wall 64, a rear end wall 66, a riser wall 67 and parallel sides 68. Extending vertically through the upper shoe 20, also, is a cylindrical bore 70 for receiving the cam shaft 22.

At the front end wall 64 of the upper shoe 20, a step 72 is formed by removing a portion of the wall 64 from the top 62 to the step 72 along the width of the upper shoe 20. The step 72 provides a notch for receiving the shoulder 38 of the lower shoe 18 when the clamping mechanism 10 is assembled and locked. An inner wall 74 extends downwardly and inwardly toward the base 60 from the step 72 to the riser wall 67 at an angle to the axis of the cylindrical bore 70.

A concave recess 76 is included in the step 72 to provide clearance for the neck 54 of the retention knob 27. A cavity 75 is provided in the inner wall 74 at an angle $\alpha$ to the axis of the bore 70 for engaging and mating the conical gripping surface 56 of retention knob 7. The, angle $\alpha$ of cavity 75 also corresponds to the angle $\alpha$ of cavity 43 in inner wall 40. The upper shoe 20 includes a horizontal bore 29 extending from the rear end wall 66 and terminating in the cylindrical bore 70 for receiving the drive pin 24 which is slidably mounted in the bore 29 for engaging the cam shaft 22. A kicker knob 78 is affixed to the riser wall 67 for engaging a hollow provided at the inner end of the retention knob 27 as well as providing a means for releasing the tooling adaptor 16 during replacement. (See FIG. 4).

In the illustrative embodiment, the upper and lower shoes 20 and 18 are described as generally rectangular in structure. It is to be understood that said shoes can be of a different shape, e.g., cylindrical, without departing from the principles of the invention. In the case of cylindrical shoes, the cavity 12 of the tool clamp block 14 would have to be reconfigured to conform to the cylindrical shape of said shoes. In addition, a locking arrangement, e.g., a key and slot, would necessarily be incorporated into the outer periphery of the shoes and into the inner wall of the cavity 12 to prevent rotation of the shoes within the cavity 12 as the cam shaft 22 is rotated to impart axial movement of the shoes.

Figure 3:
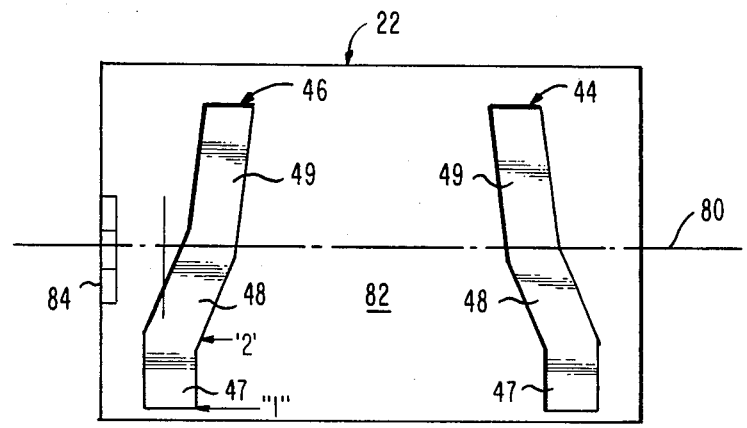
FIG. 3 illustrates the camming schedule of a cam shaft of the clamping mechanism according to the present invention.

Details of the cam shaft 22 are illustrated in FIG. 2 and more particularly in FIG. 3, which depicts the cam shaft 22 in schedule.

In the preferred embodiment, the cam shaft 22 is cylindrical in shape having an axis 80 and an outside surface 82. An upper groove 44 and a lower groove 46 of opposite hand are provided in the surface 82 of the cam shaft 22. The grooves 44 and 46 are of sufficient width to accomodate the diameter of drive pins 24 and 25. The grooves are constructed at three separate angular lies with respect to the axis 80 to effect three separate axial translation zones for the upper and lower shoes. The first zone 47 is essentially perpendicular to the axis 80 of the cam shaft 22 and provides a means for disassembling the clamping mechanism 10 after it has been removed from the tool clamp block 14. This is accomplished by ramping the first zone 47 from the point indicated at numeral "1" of grooves 44 and 46 from the outside surface 82 of the cam shaft 22 to the operating depth "d" of the groove indicated at numeral "2". To disassemble the clamping mechanism 10, the mechanism is removed from the tool clamp block 14, the cam shaft 22 is rotated counter-clockwise and the drive pins 24 and 25 are driven along the ramp of the first zone 47 and out their respective bores in said upper and lower shoes.

The second zone 48 provides a means for rapidly advancing the shoes 18 and 20 toward or away from each other with a minimal amount of rotation of the cam shaft 22. In the preferred embodiment, the lesser included angle formed by a plane perpendicular to the axis 80 of the cam shaft 22 and the second zone 48 of the grooves 44 and 46 is from about 10° to about 60°. The second zone 48 comprises about 45 degrees of cam shaft rotation and a shoe axial advance rate of 0.003 inches per degree of cam shaft rotation.

The third zone 49, or creep zone is the area in which the axial pull on the tool adaptor 16 as well as the clamping action on the retention knob 27 is applied. In the preferred embodiment, the lesser included angle formed by a plane perpendicular to the axis 80 of the cam shaft 22 and the third zone 49 of the grooves 44 and 46 is from about 1° to about 10°, most preferably from about 4° to about 8°. The third zone 49 comprises about 160 degrees of cam shaft rotation and a shoe axial advance rate of 0.0006 inches per degree of cam shaft rotation.

It will be appreciated that the angular lies and degrees of rotation for the individual zone may be modified without departing from the principles of the invention and without sacrificing its chief advantages.

Referring again to FIG. 2, the drive pins 24 and 25 are cylindrical in shape and are of sufficient diameter so as to provide a close slidable fit in the horizontal bores 26 and 29 of the lower and upper shoes, respectively. The length "L" of the drive pins must have a breadth greater than the breadth of the horizontal bores 26 and 29, and preferably of a length approximating the sum of the groove depth "d" of the cam shaft 22 and the breadth of the horizontal bore.

In a preferred embodiment, the ends 29 of drive pins 24 and 25 are flattened so as to provide an increased holding force, i.e., sliding friction between the drive pins 24 and 25 and the grooves 44 and 46 thereby preventing a breakaway of the cam shaft 22 after the upper and lower shoes 20 and 18 have engaged the retention knob 27.

Figure 4:
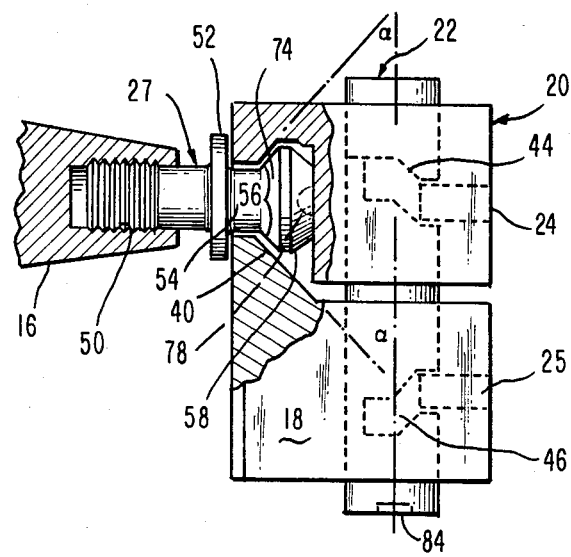
FIG. 4 is a partial section elevational view, illustrating the clamping mechanism in the locked position.

FIG. 4 is a partial sectional view of the invention illustrating the locked position of the clamping mechanism 10. As seen, the retention knob 27 is securely fastened between the upper and lower shoes 20 and 18 of the clamping mechanism 10. The cam shaft 22 extends between the upper and lower shoes 20 and 18 and drive pins 24 and 25 are shown engaging the grooves 44 and 46 of the cam shaft 22.

The operation of the clamping mechanism 10 is best understood with reference to FIGS. 1 and 4, which depict the mechanism 10 in unlocked and locked positions respectively. Referring first to FIG. 1, there is illustrated the clamping mechanism 10 in an unlocked position within a tool clamp block 14. As seen, the clamping mechanism 10 is free to float, i.e., expand or contract, within the cavity 12 of the clamp block 14. This free floating feature of the present invention ensures simple and rapid alignment of the retention knob 27 of the rotary tooling adaptor 16 between the upper and lower shoes of the clamping mechanism 10.

To secure the tooling adaptor 16 in the tool block 14, an appropriate tool (not shown) is inserted into a turning means 84 of the cam shaft 22 and a torque is applied to the cam shaft. The cam shaft rotation results in an axial translation of the upper and lower shoes 20 and 18 as the drive pins 24 and 25 slidably traverse the corresponding upper and lower grooves 44 and 46 of the cam shaft 22.

The upper and lower shoes rapidly approach the retention knob 27 attached to the tool adaptor 16 as the drive pins 24 and 25 traverse the second zone 48 of the upper and lower grooves 44 and 46. As the drive pins 24 and 25 enter the third zone 49, the inner wall 40 of the lower shoe 18 begins to wedgingly engage the conical gripping surface 56 of the retention knob 27. At or about the same time, the inner wall 74 of the upper shoe 20 also begins to wedgingly engage the conical gripping surface 56 of the retention knob 27. As the cam shaft 22 is further rotated, the drive pins continue to draw the upper and lower shoes together while the wedging action of cavity surfaces 43 and 75 of inner walls 40 and 74 against the conical surface 56 of the retention knob 27 as well as the wedging action of front end walls 32 and 64 against inside wall 11 of cavity 12 result in an axial pull and locking of the tooling adaptor 16 within the bore 17 of the tool clamp block 16. The continued rotation of the cam shaft 22 results in the upper and lower shoes clamping the retention knob 27 about the conical gripping surface 56. Concurrently, the kicker knob 78 positions itself within a hollow at the inner end of the retention knob 27. It is important to note that clearance is maintained between the shoulder 52 of the retention knob 27 and the front end walls 32 and 64 of the lower and upper shoes 18 and 20, respectively. In addition, clearance is maintained between the tip 58 of the retention knob 27 and the riser wall 67. In the fully assembled state, a clearance is also maintained between the neck 54 of the retention knob 27 and the concave recesses 76 and 42 of the shoulder 38 and step 72, respectively, while the conical surface 56 of the retention knob 27 mates with cavity surfaces 43 and 75 of the lower and upper shoes, respectively.

Finally, removal of the tooling adaptor 16 is accomplished by rotating the cam shaft 22 in the opposite direction, thereby imparting an axial movement of the upper and lower shoes in opposite directions.

As the upper and lower shoes are driven apart, the kicker knob 78 of the upper shoe 20 engages the tip 58 of the retention knob 27 to provide a slight axial movement of the rotary tooling adaptor 16. The small "kick" essentially frees the outer surface of the tooling adaptor 16 from the inside surface of the bore 17 thereby providing for easy removal of the adaptor from the tool clamp block 14.

While there has been described herein what is considered to be the preferred embodiment of the invention, the invention in its broadest aspects is not limited to the described embodiment and departures may be made therefrom within the scope of the accompanying claims without departing from the principles of the invention and without sacrificing its chief advantages.

I claim:

1. A clamping device for securing and locking a tool adaptor in a tool clamp device, comprising:
   an upper shoe and a lower shoe adapted for engaging the tool adaptor;
   a first drive means in communication with said upper shoe;
   a second drive means in communication with said lower shoe; and
   cam means in communication with said upper and lower shoes, having an axis and least two angular lies, and including means for engaging said drive means for advancing said shoes along the axis of said cam means at said at least two angular lies to secure and lock the tool adaptor within a tool clamp block.

2. The clamping device according to claim 1, wherein said lower shoe is generally rectangular in structure, having a base, a top, opposing parallel side walls, a rear end wall, and a front end wall extending above said top to form a shoulder for engaging and securing a retention knob affixed to the tool adaptor and an inner sloping wall extending downwardly from the shoulder to the top, wherein said lower shoe includes a cylindrical bore extending vertically therethrough from the top to the base for receiving said cam means and wherein said rear end wall includes a horizontal bore extending therethrough for receiving said second drive means for engaging said cam means.

3. The clamping device according to claim 2, wherein said upper shoe is generally rectangular in structure, having a base, a top, opposing parallel side walls, a rear end wall, a riser wall, a front end wall having a portion removed so as to form a step for engaging and securing a retention knob affixed to the tool adaptor, and a tapered inner wall extending downwardly from the step to the riser wall, wherein said upper shoe includes a cylindrical bore extending therethrough from the top to the base for receiving said cam means and wherein said rear end wall includes a horizontal bore extending therethrough for receiving said first drive means for engaging said cam means.

4. The clamping device according to claim 3, wherein said cam means is a cylindrical rod slidably positioned within the cylindrical bores of said upper and lower shoes, said rod having an axis, an outer surface and a rotating means and wherein said rotating means includes two screw-like grooves having said at least two angular lies of opposite hand engraved in said outer surface.

5. The clamping device of claim 4, wherein each of said grooves is engraved at three distinct angular lies with respect to the axis of said cylindrical rod so as to form an assembly zone, a rapid advance zone, and a creep zone.

6. The clamping device of claim 5, wherein the assembly zone of said grooves is essentially perpendicular to the axis of said cylindrical rod.

7. The clamping device of claim 5, wherein the lesser included angle between a plane perpendicular to the axis of said cylindrical rod and the rapid advance zone of each of said grooves is about 10° to about 60°.

8. The clamping device of claim 5, wherein the lesser included angle between a plane perpendicular to the axis of said cylindrical rod and the creep zone of each of said grooves is about 1° to about 10°.

9. The clamping device according to claim 8, wherein the lesser included angle is between 4° and 8°.

10. The clamping device according to claim 4, wherein said first and second drive means are cylindrical pins slidably positioned within the horizontal bores extending through the rear end walls of said upper and lower shoes for engaging the screw-like grooves of said cylindrical rod.

11. The clamping device of claim 2, wherein the shoulder of said lower shoe includes a cavity therein for engaging a conical surface of the retention knob of the tooling adaptor.

12. The clamping device of claim 3, wherein the step of said upper shoe includes a cavity therein for engaging a conical surface of the retention knob of the tooling adaptor.

13. A clamping device for securing and locking a tool adaptor in a tool clamp device, comprising:
   an upper shoe and a lower shoe adapted for engaging the tool adaptor wherein each of said shoes includes a cylindrical bore extending vertically therethrough;
   a first cylindrical pin slidably positioned in a wall of said upper shoe;
   a second cylindrical pin slidably positioned in a wall of said lower shoe;
   a cam shaft positioned in the cylindrical bores of said upper and lower shoes, said shaft having an axis and at least two angular lies and including means for simultaneously engaging said first cylindrical pin and said second cylindrical pin for advancing said shoes along the axis of said shaft to lock and unlock the tool adaptor within a tool clamp block.

* * * * *

UNITED STATES PATENT AND TRADEMARK OFFICE
CERTIFICATE OF CORRECTION

PATENT NO. : 4,729,702
DATED : March 8, 1988
INVENTOR(S) : Walter Kelm

It is certified that error appears in the above—identified patent and that said Letters Patent is hereby corrected as shown below:

Column 3, line 68, change "7" to -- 27 --.

Column 6, line 46, insert -- at -- after "and".

In the Drawings:

Amend FIGURE 2 in accordance with the attached sheet.

Signed and Sealed this

Thirty-first Day of January, 1989

*Attest:*

DONALD J. QUIGG

*Attesting Officer*      *Commissioner of Patents and Trademarks*